(12) United States Patent
Badding et al.

(10) Patent No.: US 11,605,836 B2
(45) Date of Patent: Mar. 14, 2023

(54) LI/GARNET ELECTROLYTE INTERFACE WITH LOW INTERFACIAL RESISTANCE

(71) Applicants: Corning Incorporated, Corning, NY (US); Shanghai Institute of Ceramics, Chinese Academy of Sciences, Shanghai (CN)

(72) Inventors: Michael Edward Badding, Campbell, NY (US); Jun Jin, Shanghai (CN); Zhen Song, Painted Post, NY (US); Jianmeng Su, Shanghai (CN); Zhaoyin Wen, Shanghai (CN); Tongping Xiu, Shanghai (CN)

(73) Assignee: CORNING INCORPORATED, Corning, NY (US)

( * ) Notice: Subject to any disclaimer, the term of this patent is extended or adjusted under 35 U.S.C. 154(b) by 191 days.

(21) Appl. No.: 17/196,355

(22) Filed: Mar. 9, 2021

(65) Prior Publication Data
US 2021/0288352 A1    Sep. 16, 2021

(51) Int. Cl.
*H01M 10/0585* (2010.01)
*H01M 10/052* (2010.01)
(Continued)

(52) U.S. Cl.
CPC ....... *H01M 10/0585* (2013.01); *H01M 4/366* (2013.01); *H01M 4/382* (2013.01); *H01M 4/62* (2013.01); *H01M 10/052* (2013.01); *H01M 10/0562* (2013.01); *H01M 2004/027* (2013.01); *H01M 2300/0071* (2013.01)

(58) Field of Classification Search
CPC .. H01M 10/0585; H01M 4/366; H01M 4/382; H01M 4/62; H01M 10/052; H01M 10/0562; H01M 2004/027; H01M 2300/0071; H01M 4/1395; H01M 2300/0094; H01M 4/134; H01M 10/058; Y02E 60/10; Y02P 70/50
See application file for complete search history.

(56) References Cited

FOREIGN PATENT DOCUMENTS

| CN | 109920980 A | 6/2019 |
|---|---|---|
| JP | 5283188 B2 | 9/2013 |

OTHER PUBLICATIONS

Han et al., "Negating interfacial impedance in garnet-based solid-state Li metal batteries", Nature Materials, 16, 2017, pp. 572-579.
(Continued)

*Primary Examiner* — Helen Oi K Conley
(74) *Attorney, Agent, or Firm* — Kevin M. Johnson; Russell S. Magaziner (57) ABSTRACT

A lithium-metal battery, includes: a substrate; a cathode disposed on the substrate; a garnet solid-state electrolyte disposed on the cathode; and a lithium anode disposed on the garnet solid-state electrolyte, such that a discoloration layer is disposed at an interface of the lithium anode and garnet solid-state electrolyte, the discoloration layer includes: a first portion; and a second portion, such that the first portion has a lithium component and the second portion has a garnet component. A method of forming a lithium-metal battery, includes: stacking a garnet source with at least one lithium source; and heating the stack at a temperature of at least 300° C. for a time in a range of 1 sec to 20 min to form a discoloration layer, such that the discoloration layer is disposed at an interface of the garnet source and the lithium source.

14 Claims, 8 Drawing Sheets

(51) Int. Cl.
*H01M 10/0562* (2010.01)
*H01M 4/36* (2006.01)
*H01M 4/62* (2006.01)
*H01M 4/38* (2006.01)
*H01M 4/02* (2006.01)

(56) References Cited

OTHER PUBLICATIONS

Luo et al., "Transition from Superlithiophobicity to Superlithiophilicity of Garnet Solid-State Electrolyte", J. Am. Chem. Soc. 138, Aug. 28, 2016, pp. 12258-12262.
Sharafi et al., "Surface Chemistry Mechanism of Ultra-Low Interfacial Resistance in the Solid-State Electrolyte Li7La3Zr2O12", Chem. Mater, vol. 29, No. 18, 2017, pp. 7961-7968.
Tenhaeff, W. E. et al., "Resolving the Grain Boundary and Lattice Impedance of Hot-Pressed Li7La3Zr2O12 Garnet Electrolytes" ChemElectroChem 1, 2014, pp. 375-378.
Thorben Krauskopf et al., "Toward a Fundamental Understanding of the Lithium Metal Anode in Solid-State Batteries—An Electrochemo-Mechanical Study on the Garnet-Type Solid Electrolyte Li6.25Al0.25La3Zr2O12", ACS Appl. Mat. Interfaces 11, Mar. 2019 pp. 14463-14477.
Tsai et al., "Li7La3Zr2O12 Interface Modification for Li Dendrite Prevention", ACS Appl. Mat. Interfaces, vol. 8, No. 16, Mar. 2016, pp. 10617-10626.
Wang, et al.,"Fundamental study on the wetting property of liquid lithium", Energy Storage Materials 14, 2018, pp. 345-350.
Zhu, Y. et al. Dopant-Dependent Stability of Garnet Solid Electrolyte Interfaces with Lithium Metal. Adv. Energy Mater. 9, 1803440 (2019).

LI/GARNET ELECTROLYTE INTERFACE WITH LOW INTERFACIAL RESISTANCE

This application claims the benefit of priority to Chinese Application No. 202010163216.5, filed Mar. 10, 2020, the content of which is incorporated herein by reference in its entirety.

BACKGROUND

1. Field

This disclosure relates to Li/garnet electrolyte interfaces with low interfacial resistance and methods of manufacturing thereof.

2. Technical Background

Conventional Li-ion batteries are already reaching their limits in terms of energy density and safety, posing a challenge for large-scale application in electrical equipment. For example, garnet-based solid-state Li-metal batteries have large interfacial resistance between the Li anode and garnet electrolyte. Due to the rigid ceramic nature and poor lithium wettability of garnet, contact between lithium metal and garnet is often insufficient, thereby leading to large polarization and high interfacial resistance.

The present application discloses improved Li anode/garnet electrolyte interfaces and methods of formation thereof for solid-state lithium metal battery applications.

SUMMARY

In some embodiments, a lithium-metal battery, comprises: a substrate; a cathode disposed on the substrate; a garnet solid-state electrolyte disposed on the cathode; and a lithium anode disposed on the garnet solid-state electrolyte, wherein a discoloration layer is disposed at an interface of the lithium anode and garnet solid-state electrolyte, the discoloration layer comprising: a first portion; and a second portion, wherein the first portion including a lithium component and the second portion including a garnet component.

In one aspect, which is combinable with any of the other aspects or embodiments, an interfacial resistance at the interface is less than 1 $\Omega \cdot cm^2$.

In one aspect, which is combinable with any of the other aspects or embodiments, a thickness of the discoloration layer is 1 nm to 50 nm.

In one aspect, which is combinable with any of the other aspects or embodiments, the battery further comprises: a modification coating layer disposed between the garnet solid-state electrolyte and the lithium anode.

In one aspect, which is combinable with any of the other aspects or embodiments, the modification coating layer comprises at least one of: Au, Ag, Al, Si, C, Zn, Mg, Sn, Ti, B, Pb, Ge, or combinations thereof; and has a thickness of 1 nm to 50 nm.

In one aspect, which is combinable with any of the other aspects or embodiments, the first portion is positioned (A) in pores of the second portion; (B) atop a surface of the second portion; or (C) a combination thereof.

In some embodiments, a method of forming a lithium-metal battery, comprises: stacking a garnet source with at least one lithium source; and heating the stack at a temperature of at least 300° C. for a time in a range of 1 sec to 20 min to form a discoloration layer, wherein the discoloration layer is disposed at an interface of the garnet source and the lithium source.

In one aspect, which is combinable with any of the other aspects or embodiments, the heating is conducted at a temperature of at least 320° C.

In one aspect, which is combinable with any of the other aspects or embodiments, the method further comprises: prior to stacking the garnet source with the at least one lithium source, sputtering the garnet source with a modification coating source.

In one aspect, which is combinable with any of the other aspects or embodiments, the modification coating layer comprises at least one of: Au, Ag, Al, Si, C, Zn, Mg, Sn, Ti, B, Pb, Ge, or combinations thereof.

In one aspect, which is combinable with any of the other aspects or embodiments, a thickness of the discoloration layer is 1 nm to 50 nm; and a thickness of the modification coating layer is 1 nm to 50 nm.

In one aspect, which is combinable with any of the other aspects or embodiments, the discoloration layer comprises: a first portion; and a second portion, wherein the first portion includes a lithium component and the second portion includes a garnet component.

In one aspect, which is combinable with any of the other aspects or embodiments, the first portion is positioned (A) in pores of the second portion; (B) atop a surface of the second portion; or (C) a combination thereof.

In one aspect, which is combinable with any of the other aspects or embodiments, the interface is configured to have an interfacial resistance of less than 1 $\Omega \cdot cm^2$.

BRIEF DESCRIPTION OF THE DRAWINGS

The disclosure will become more fully understood from the following detailed description, taken in conjunction with the accompanying figures, in which:

FIGS. 6A to 6E illustrate surface analyses of garnet before and after contact with molten Li. Specifically.

FIGS. 8A and 8B illustrate electrochemical measurements of Li symmetric cells with discoloration layers. Specifically, FIG. 8A are CCD measurement results of the Li symmetric cell measured at 20 min per period with a current step ranging from 0.2 mA·cm$^{-2}$ to 1.4 mA·cm$^{-2}$

FIGS. 9A and 9B illustrate electrochemical measurements of Li symmetric cells at 60° C. Specifically, FIG. 9A are CCD measurement results of the Li symmetric cell measured at 20 min per period with a current step ranging from 0.5 mA·cm$^{-2}$ to 3.5 mA·cm$^{-2}$

FIGS. 10A and 10B illustrate electrochemical measurements of Li symmetric cells without discoloration layers. Specifically, FIG. 10A are CCD measurement results of the Li symmetric cell measured at 20 min per period with a current step ranging from 0.2 mA·cm$^{-2}$ to 1.0 mA·cm$^{-2}$

FIG. 12 illustrates electrochemical measurements of Li symmetric cells with discoloration layers at 25° C. Specifically.

DETAILED DESCRIPTION

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

Aimed at solving the problems defined above, in one proposal, lithiophilic coating layers such as Au, Si, Al$_2$O$_3$, etc. are introduced at the Li anode/garnet electrolyte interface via atomic layer deposition (ALD); however, this method is expensive and complex, especially for large-scale implementation. An alternative approach involves application of very high external mechanical pressures to Li anode/garnet electrolyte interface for sufficient contact. This method often results in damage to the battery cell, is difficult to implement, and does not assure a sufficiently low interfacial resistance.

The present disclosure relates to solid-state Li-metal batteries based on garnet solid electrolytes. In particular, the present disclosure describes in situ formation of a discoloration layer (i.e., reduction layer) at the Li anode/garnet (e.g., Ta-doped garnet) electrolyte interface as one means for reducing and/or eliminating interfacial resistance without using a coating layer or application of high mechanical pressure. In some embodiments, the Li-wetting property of garnet may be improved for continuously tight contact between the Li anode and garnet electrolyte via a heat treatment of at least 250° C. (e.g., 340° C.). This heat treatment results in a discoloration (i.e., reduction) layer having a thickness ranging several tens of nanometers at the interface. Cells comprising the discoloration layer exhibits excellent cycling performance, as the Li anode/garnet electrolyte interfacial resistance is reduced to less than 1 Ω·cm$^2$, or less than 0.5 Ω·cm$^2$, or less than 0.1 Ω·cm$^2$ at room temperature.

Figure 1:
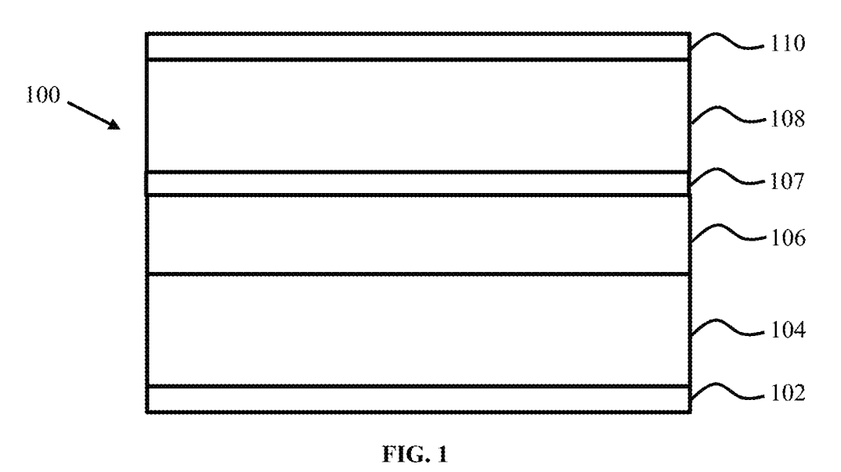
FIG. 1 illustrates a general structure of a solid-state lithium metal battery, according to some embodiments.

FIG. 1 illustrates a general structure of a solid-state lithium metal battery, according to some embodiments. It will be understood by those of skill in the art that the processes described herein can be applied to other configurations of solid-state lithium metal battery structures.

In some embodiments, battery 100 may include a substrate 102 (e.g., a current collector), a cathode 104 disposed on the substrate, a solid-state electrolyte 106 disposed on the cathode a lithium electrode (e.g., anode) 108 disposed on the solid-state electrolyte, a discoloration layer 107 disposed between the solid-state electrolyte and the anode, and a second current collector 110 disposed on the anode. These can be disposed horizontally in relation to each other or vertically.

In some embodiments, the battery may include an optional coating layer disposed on the cathode; an optional first interlayer disposed between either the coating layer or the substrate and the solid-state electrolyte; an optional second interlayer disposed between the solid-state electrolyte and the lithium electrode; an optional third interlayer disposed between the solid-state electrolyte and the cathode; or combinations thereof.

In some examples, the substrate 102 may a current collector including at least one of three-dimensional nickel (Ni) foam, carbon fiber, foils (e.g., aluminum, stainless steel, copper, platinum, nickel, etc.), or a combination thereof.

In some examples, the optional first, second, and/or third interlayers may be independently chosen from at least one of carbon-based interlayers (e.g., interlinked freestanding, micro/mesopore containing, functionalized, biomass derived); polymer-based interlayers (e.g., polyethylene oxide (PEO), polypyrrole (PPY), polyvinylidene fluoride, etc.); metal-based (e.g., Ni foam, etc.); liquid electrolytes (e.g., LiPF$_6$ in ethylene (EC)/dimethyl carbonate (DMC); ionic liquid-based (e.g., LiCF$_3$SO$_3$/CH$_3$CONH$_2$ or PEO$_{18}$LiTFSI-10% SiO$_2$-10% IL, the latter being a combination of PEO, bis(trifluoromethane) sulfonimide lithium salt (LiN(CF$_3$SO$_2$)$_2$, or LiTFSI), SiO$_2$ nanoparticles, and ionic liquid); or a combination thereof.

In some examples, solid-state electrolyte 106 may be used to address common safety concerns such as leakage, poor chemical stability, and flammability often seen in Li-metal batteries employing liquid electrolytes. Moreover, solid-state electrolytes can also suppress polysulfide shuttling from the cathode to the anode, thereby leading to improved cathode utilization and a high discharge capacity and energy density. In some examples, the solid-state electrolyte may include at least one of garnet (e.g., $Li_7La_3Zr_2O_{12}$ (LLZO), doped-LLZO (e.g., with Al, Mo, W, Nb, Sb, Ca, Ba, Sr, Ce, Hf, Rb, Ta, or combinations thereof), $Li_{6.4}La_3Zr_{1.4}Ta_{0.6}O_{12}$ or $Li_{6.5}La_3Zr_{1.4}Ta_{0.5}O_{12}$ (both LLZTO), or combinations thereof), $Li_{10}GeP_2S_{12}$, $Li_{1.5}Al_{0.5}Ge_{1.5}(PO_4)_3$, $Li_{1.4}Al_{0.4}Ti_{1.6}(PO_4)_3$, $Li_{0.55}La_{0.35}TiO_3$, interpenetrating polymer networks of poly(ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed $Li_3PS_4$, $Li_6PS_5Cl$, or combinations thereof.

In some examples, the anode 108 may comprise lithium (Li) metal. In some examples, the battery may include at least one anode protector such as electrolyte additives (e.g., $LiNO_3$, lanthanum nitrate, copper acetate, $P_2S_5$, etc.), artificial interfacial layers (e.g., $Li_3N$, $(CH_3)_3SiCl$, $Al_2O_3$, LiAl, etc.), composite metallics (e.g., $Li_7B_6$, Li-rGO (reduced graphene oxide), layered Li-rGO, etc.), or combinations thereof. In some examples, a thin layer of metal (e.g., Au) may be ion-sputter coated to form a contact interface between the anode 108 and the first interlayer or between the anode and the solid-state electrolyte. In some examples, a thin layer of silver (Ag) paste may be brushed to a surface of the solid-state electrolyte 106 to form a close contact between the anode 108 and solid-state electrolyte 106.

In some examples, the optional coating layer may comprise at least one of carbon polysulfides (CS), polyethylene oxides (PEO), polyaniline (PANI), polypyrrole (PPY), poly (3,4-ethylenedioxythiophene) (PEDOT), polystyrenesulfonic acid (PSS), polyacrylonitrile (PAN), polyacrylic acid (PAA), polyallylamine hydrochloride (PAH), poly(vinylidene fluoride-co-hexafluoropropylene) (P(VdF-co-HFP)), poly(methylmethacrylate) (PMMA), polyvinylidene fluoride (PVDF), poly(diallyldimethyl ammonium) bis(trifluoromethanesulfonyl)imide (TFSI) (PDDATFSI), or combinations thereof, and at least one lithium salt (e.g., bis (trifluoromethane) sulfonimide lithium salt ($LiN(CF_3SO_2)_2$) (LiTFSI), lithium perchlorate, lithium bis(oxalato) borate (LiBOB), lithium bis(fluorosulfonyl)imide (LiFSI), lithium trifluoromethanesulfonate ($LiCF_3SO_3$) (LiTf), lithium bis (trifluoromethanesulfonimide) ($Li(C_2F_5SO_2)_2N$) (LiBETI), or combinations thereof). In some examples, the optional coating layer may additionally comprise at least one of, or at least two of, or at least three of nitrogen, carbon, cobalt, titanium, tantalum, and tungsten.

In some examples, the cathode 104 may comprise at least one of: $LiCoO_2$, $LiNiO_2$, $Li_2MnO_3$, $LiNi_{0.5}Mn_{1.5}O_4$, $LiFePO_4$, $LiNi_xCo_yMn_{1-x-y}O_2$, or combinations thereof. In some examples, the cathode 104 may comprise a composite sulfur cathode including a conductive carbon component (e.g., carbonized dispersed cotton fiber (CDCF)), an electrolyte component (e.g., $Li_{10}GeP_2S_{12}$, $\beta\text{-}Li_3PS_4$, $Li_{9.6}P_3S_{12}$, $Li_3PS_4$, $Li_7P_3S_{11}$, a $x(Li_2S)\text{-}y(P_2S_5)$ electrolyte material (where x and y are greater than one), etc.), and/or elemental sulfur. In some examples, the composite sulfur cathode may also include an ionic liquid 104d (e.g., PY14FSI, PY14TFSI, P13TFSI, P14TFSI, PYR13TFSI, PP14TFSI, or combinations thereof).

EXAMPLES

Example 1—Preparation of Garnet Electrolyte Pellets

Cubic phase $Li_{6.5}La_3Zr_{1.4}Ta_{0.5}O_{12}$ (LLZTO) is synthesized from starting powders of $LiOH\cdot H_2O$ (AR), $La_2O_3$ (99.99%), $ZrO_2$ (AR), $Ta_2O_5$ (99.99%) with stoichiometry ratio. Two (2) wt. % excess of $LiOH\cdot H_2O$ is added to compensate for lithium loss during the sintering process. Traces of moisture and adsorbed $CO_2$ are removed from $La_2O_3$ by heat treatment at 900° C. for 12 hrs. Raw materials are mixed via a wet grinding process in which yttrium-stabilized zirconium oxide (YSZ) balls and isopropanol (IPA) are used as the milling media. The mixture is dried and calcined at 950° C. for 6 hrs in an alumina crucible to obtain pure cubic garnet phase powder. These powders are pressed into Φ16 mm green pellets and sintered at 1230° C. for 1 hr covered with LLZTO powder with 15 wt. % Li excess in platinum crucibles.

Example 2—Li Symmetric Cell Assembly

The garnet pellets, for example, as prepared in Example 1, are initially polished inside an argon-filled glovebox using silicon carbide (SiC) sandpaper. Thereafter, fresh Li foil is directly attached and pressed onto both sides of the polished garnet pellets. Then, the garnet pellet sandwiched between two Li foils is positioned in a stainless steel plate and heated at a temperature in a range of 250° C. to 400° C. (e.g., 300° C. to 350° C.) for a time in a range of 1 sec to 20 min (e.g., 3 min to 10 min), followed by naturally cooling to room temperature.

In some examples, the heating is conducted at a temperature in the range of 250° C. to 400° C., or 275° C. to 375° C., or 300° C. to 350° C. (e.g., 340° C.), or 250° C. to 300° C., or 350° C. to 400° C., or any value or range disclosed therein. In some examples, the time is conducted in the range of 1 sec to 20 min, or 30 sec to 15 min, or 1 min to 10 min, or 3 min to 10 min, or 5 min to 10 min, or any value or range disclosed therein.

Figure 2:
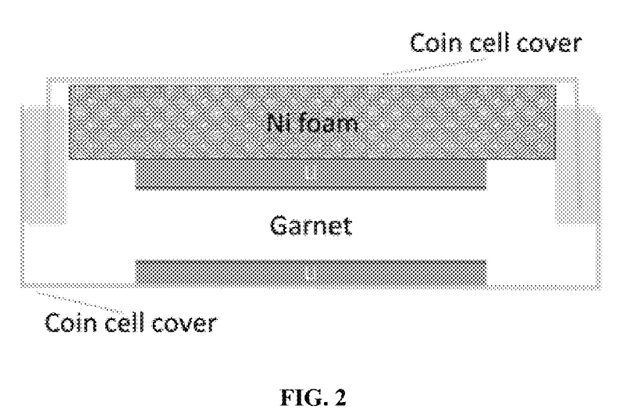
FIG. 2 illustrates a general structural diagram of a Li symmetric cell based on a garnet electrolyte, according to some embodiments.

The 2025-type Li/garnet/Li symmetric cells are then assembled in glove box, as shown in FIG. 2, which illustrates a structural diagram of a Li symmetric cell based on garnet electrolytes, according to some embodiments. Sealing pressure of the coin cell is in a range of 1 MPa to 10 MPa (e.g., ~5 MPa). As shown in FIG. 2, Ni foam serves as a cushion to avoid garnet crack during sealing, lithium sheets function as the electrode, and the garnet pellet serves as a separator for charge (e.g., electron, $Li^+$ ion) conductors. These types of Li symmetric cell may be used to measure interfacial resistance between Li and garnet and also estimate cycling stability of the Li/garnet interface—i.e., by charging and discharging (e.g. Li stripping/plating from one Li sheet on a first side of the garnet to the second Li sheet on a second side of the garnet) under an applied voltage.

In some embodiments, a lithium-metal battery, comprising: a substrate; a cathode disposed on the substrate; a garnet solid-state electrolyte disposed on the cathode; and a lithium anode disposed on the garnet solid-state electrolyte may include a discoloration coating layer as described herein and having comparable attributes. Thus, attributes of the lithium anode/garnet solid-state electrolyte may be incorporated as part of the Li-metal battery.

Example 3—Characterization Studies

Materials Characterization
Phase structures of garnet pellets are determined by X-ray powder diffraction (Rigaku, Ultima IV) in the 2θ range of 10°-60° at room temperature.
Microstructure images of garnet pellets are captured by scanning electron microscope (SEM) (Hitachi, S-3400N).

Surface chemistry of garnet pellets is determined by X-ray photoelectron spectroscopy (XPS) (Thermo scientific ESCALAB 250). Before conducting XPS analyses, Li metal on the garnet pellet (see FIG. 2) is removed by washing with anhydrous alcohol. Depth profiling are conducted by argon (Ar$^+$) sputtering with an etching speed of 3 nm/min. Because carbon species on the garnet surface are removed, binding energies are calibrated using an oxygen (O) 1 s peak at 530.7 eV.

Electrochemical Measurements

Electrochemical impedance spectroscopy (EIS) measurements are conducted by AC impedance analysis (Autolab, Model PGSTAT302N) with a frequency range of 0.1 Hz to 1 MHz at room temperature. Electronic conductivity of Ta-doped garnet is measured by applying a 2 V DC voltage on the pellet for 30 min at room temperature. Li-ion blocking Au electrodes are used in ionic and electronic conductivity measurements of garnet pellets.

Galvanostatic cycling and plating experiments of Li symmetric cells are tested by battery test system (LAND, CT2001A).

Example 4—Sample Preparation

Working Example 1 (WE1)

Ta-doped garnet pellets are prepared according to Example 1 above, and then polished to a thickness of 1 mm. Then fresh Li foil having a diameter of 12 mm and thickness of 0.3 mm is directly pressed onto both sides of the garnet pellet by hand. Thereafter, the Li foil-sandwiched garnet pellet is placed in a stainless steel plate and heated to 340° C. for 5 min, followed by naturally cooling down to room temperature. The obtained Li/garnet/Li symmetric cells are then sealed in 2025-type coin cells, as in FIG. 2 for characterization.

Comparative Example 1 (CE1)

Comparative Example 1 was prepared as described above for Working Example 1, except for the heat treatment temperature, which was conducted at 300° C.

Working Example 2 (WE2)

Working Example 2 was prepared as described above for Working Example 1, except that following the step of polishing to a thickness of 1 mm and prior to the step of pressing Li foil, the polished pellets are sputtered with gold (Au) as a modification coating layer to a thickness of approximately 20 nm. In some examples, the modification coating layer may comprise at least one of Au, Ag, Al, Si, C, Zn, Mg, Sn, Ti, B, Pb, Ge, or combinations thereof. In some examples, the thickness of the modification coating layer is in a range of 1 nm to 50 nm, or 5 nm to 40 nm, or 10 nm to 25 nm.

Comparative Example 2 (CE2)

Comparative Example 2 was prepared as described above for Working Example 2, except for the heat treatment temperature, which was conducted at 300° C.

Working Example 3 (WE3)

A LiNi$_{0.5}$Co$_{0.2}$Mn$_{0.3}$O$_2$ (NCM) cathode was prepared by slurry coating procedure. NCM powder, super P (carbon source) and polyvinylidene fluoride (PVDF; dissolved in N-methylpyrrolidone) are mixed by vacuum stir in a weight ratio of 75:10:15, respectively. The obtained slurry is coated on Al foil and cut into sheets 14 mm in diameter, and then dried under vacuum at 70° C. for 24 hours to form a NCM cathode sheet. A fuel cell is assembled in a CR2025 coin cell in glove box whereby lithium sheets (as the anode) are pressed onto one side of garnet and heated to 340° C. for about 5 min. Then, the one-side Li-coated garnet was positioned over the NCM cathode sheet. A 20 uL·cm$^{-2}$ liquid electrolyte (1M LiPF$_6$ in EC/DMC) is then used to wet the NCM cathode/garnet interface. Ni foam serves as a cushion to avoid garnet crack during sealing. Sealing pressure of the coin cell is in a range of 1 MPa to 10 MPa (e.g., ~5 MPa).

Preparation conditions are summarized in Table 1.

TABLE 1

| Sample | Polished Pellet Thickness (mm) | Au Mod. Layer? (20 nm) | Li Foil? ($\Phi$ = 12 mm; Thickness = 0.3 mm) | Heating Temp (° C.) | Heating Time (min) |
| --- | --- | --- | --- | --- | --- |
| WE1 | 1 | No | Yes | 340 | 5 |
| CE1 | 1 | No | Yes | 300 | 5 |
| WE2 | 1 | Yes | Yes | 340 | 5 |
| CE2 | 1 | Yes | Yes | 300 | 5 |

Figure 3A:
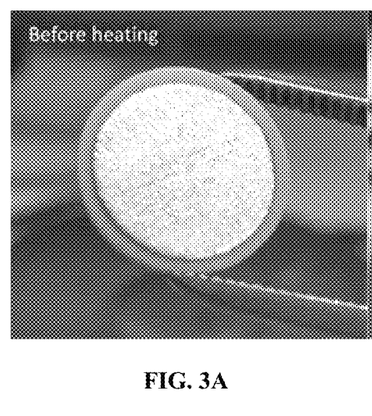
FIGS. 3A and 3B illustrate digital images of a garnet pellet with lithium sheet before (FIG. 3A) and after (FIG. 3B) heating at 340° C., according to some embodiments.
Figure 3B:
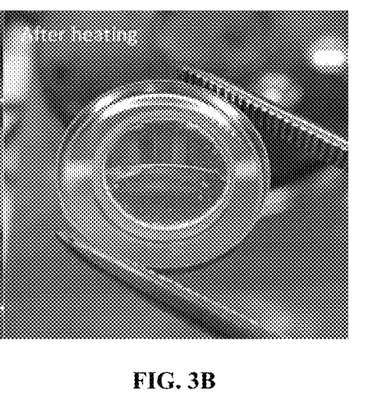

FIGS. 3A and 3B illustrate digital images of WE1 before (FIG. 3A) and after (FIG. 3B) heating at 340° C. It is clearly seen that lithium metal is able to spread out over the garnet pellet after the 340° C. heat treatment, indicating an enhanced lithium wettability over garnet thus a better contact between lithium metal and garnet and leading to lower interfacial resistance. For example, wettability of the lithium metal over the garnet pellet may be indicated by contact angle measurements, which in this case, were less than 20°.

Figure 4A:
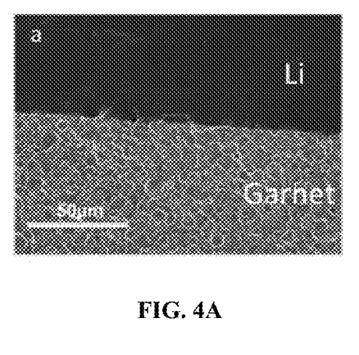
FIGS. 4A and 4B illustrate scanning electron microscopy (SEM) images of a cross section of a Li/garnet interface at 500× (FIG. 4A) and 5000× (FIG. 4B) magnifications, according to some embodiments.
Figure 4B:
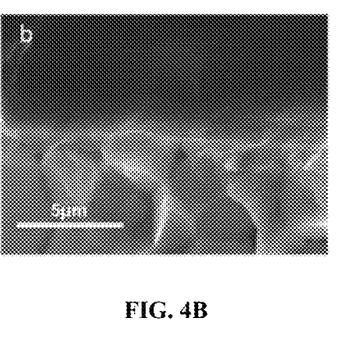

FIGS. 4A and 4B illustrate SEM images of a cross section of a Li/garnet interface at 500× (FIG. 4A) and 5000× (FIG. 4B) magnifications, according to some embodiments. For WE1, after the step of polishing to a thickness of 1 mm, the polished surface of garnet is observed as being filled by lithium metal (i.e., by Li coating the garnet surface and/or Li entering into pores of the garnet pellet) after fresh Li foil is attached and pressed onto both sides of the garnet pellet, thereby realizing a continuously tight contact.

Figure 5:
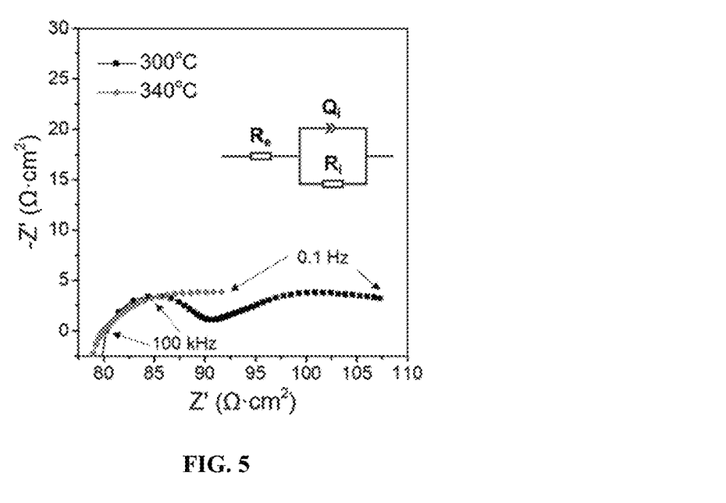
FIG. 5 illustrates Nyquist plots of Li symmetric cells with bare garnet after a 300° C. treatment and a 340° C. heat treatment, according to some embodiments.

FIG. 5 illustrates Nyquist plots of Li symmetric cells with bare garnet (i.e., no Au modification coating layer) after a 300° C. treatment (CE1) and a 340° C. heat treatment (WE1), according to some embodiments. Interfacial resistance (as evidenced by a semi-circle with an apex frequency of 100 kHz) of the CE1 cell is tested as 11 Ω·cm$^2$. In contrast, no obvious semi-circle is observed for WE1; only a low-frequency tail is seen in the impedance test. This lack of a semi-circle (which corresponds to interfacial resistance) indicates the Li/garnet interfacial resistance is too low to be detected. In other words, the interfacial resistance was found to be less than 0.1 Ω·cm$^2$.

Figure 6A:
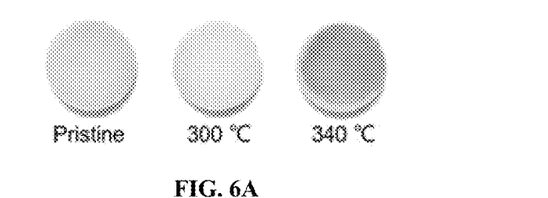
FIG. 6A is a comparison of garnet pellet color change before and after contact with molten Li at varying temperatures.
Figure 6B:
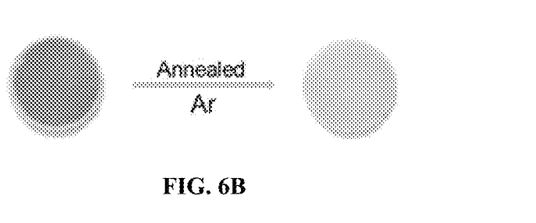
FIG. 6B illustrates surface recovery of discolored garnet after annealing in argon atmosphere at 300° C. for 30 min.

FIGS. 6A to 6E illustrate surface analyses of garnet before and after contact with molten Li for WE1 and CE1. Specifically, FIG. 6A is a comparison of garnet pellet color change before contact with molten Li (i.e., pristine) and after contact with molten Li at varying temperatures (i.e., 300° C. for CE1 and 340° C. for WE1). For example, while no discoloration is observed after heating at 300° C. (CE1), after at heating at 340° C. (WE1), the garnet pellet experienced a color change in comparison with pristine garnet. Discoloration takes place only at the Li contact area (i.e., Li/garnet interface) and can be removed by slight polishing. Outside of slightly polishing, surface recovery of the discolored garnet may also be accomplished after another heat treatment (i.e., annealing) in argon atmosphere at 300° C. for 30 min (FIG. 6B). In other words, the discoloration remains unchanged after cooling to room temperature following the heat treatment at 340° C., but may revert to pristine coloration after a second heat treatment in argon or air atmosphere at 300° C.

Figure 6C:
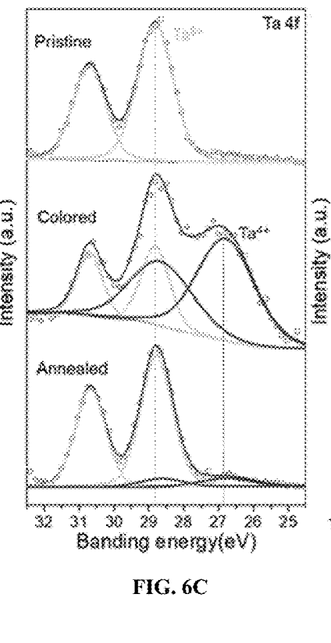
FIG. 6C illustrates a tantalum (Ta) 4f spectra of garnet pellets after varying treatments.

FIG. 6C illustrates a tantalum (Ta) 4f spectra of WE1 garnet pellets after varying treatments. For a pristine Ta-doped garnet, only $Ta^{5+}$ peaks are detected. But as the garnet experiences discoloration after heating at 340° C. ("colored"), new $Ta^{4+}$ peaks are detected. After annealing the discolored garnet in Ar at 300° C. ("annealed"), $Ta^{4+}$ peak intensity dissipates—almost completely disappears—which is in agreement with the vanishing discoloration, as seen in FIG. 6B. Thus, formation of discoloration results from interfacial reduction of $Ta^{5+}$. To further determine discoloration layer thickness, a depth profiling was conducted.

Figure 6D:
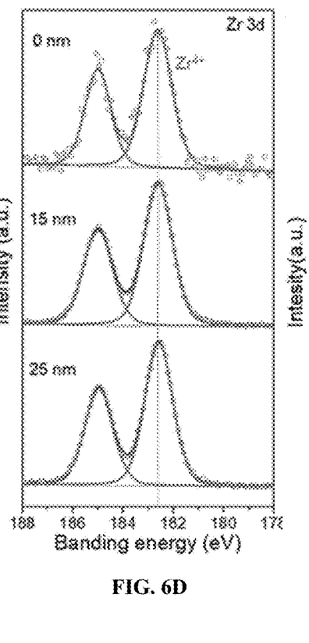
FIGS. 6D and 6E illustrate a zirconium (Zr) 3d and a Ta 4f spectra, respectively, of colored garnet at varying depths from surface, according to some embodiments.
Figure 6E:
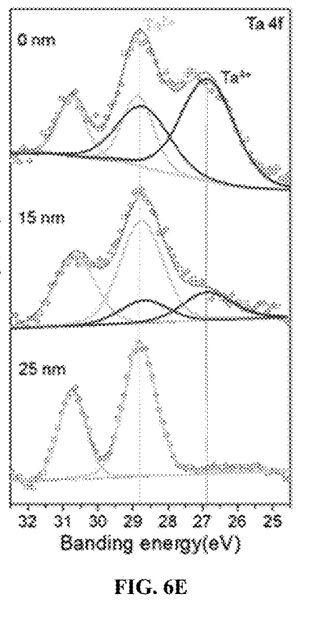

FIGS. 6D and 6E illustrate a zirconium (Zr) 3d and a Ta 4f spectra, respectively, of WE1 colored garnet at varying depths from surface, according to some embodiments. A gradual decrease in $Ta^{4+}$ peak intensity is demonstrated with increasing sputtering depth from the surface (0 nm) to 25 nm (FIG. 6E). Meanwhile, Zr species shows consistent peaks of $Zr^{4+}$ (184.9 eV and 182.6 eV) along the same sputtering depth (i.e., to 25 nm). Therefore, the formation of discoloration can only be attributed to the reduction of $Ta^{5+}$, and the thickness of the discoloration layer on garnet is estimated to be about 20 nm. In some examples, the thickness of the discoloration layer is in a range of 1 nm to 50 nm, or 5 nm to 40 nm, or 10 nm to 25 nm.

Figure 7:
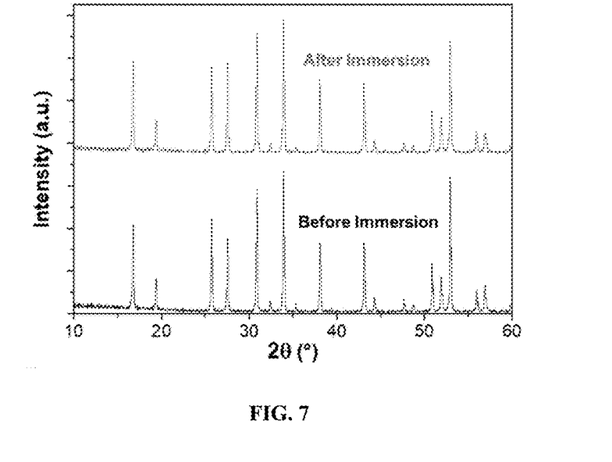
FIG. 7 illustrates x-ray diffraction (XRD) patterns of garnet before and after immersion in molten Li for 1 hour at 340° C., according to some embodiments.

FIG. 7 illustrates x-ray diffraction (XRD) patterns of garnet before and after immersion in molten Li for 1 hour at 340° C. (WE1), according to some embodiments. Sintered garnet pellets were grounded into powders before immersion in molten Li for XRD analysis. The before and after immersion patterns are similar, suggesting that no new garnet phases formed during immersion. These results also indicate that the in situ formation of discoloration layer can prevent further propagation of the interfacial reduction (i.e., valence change from $Ta^{5+}$ to $Ta^{4+}$).

Figure 8A:
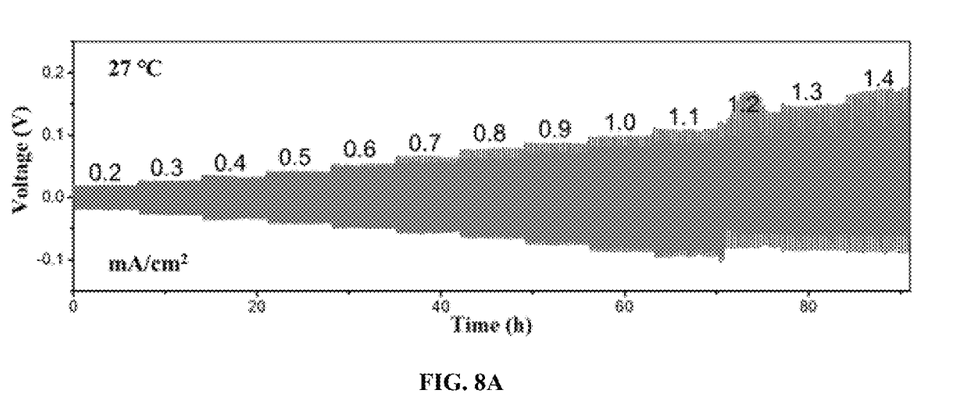
Figure 8B:
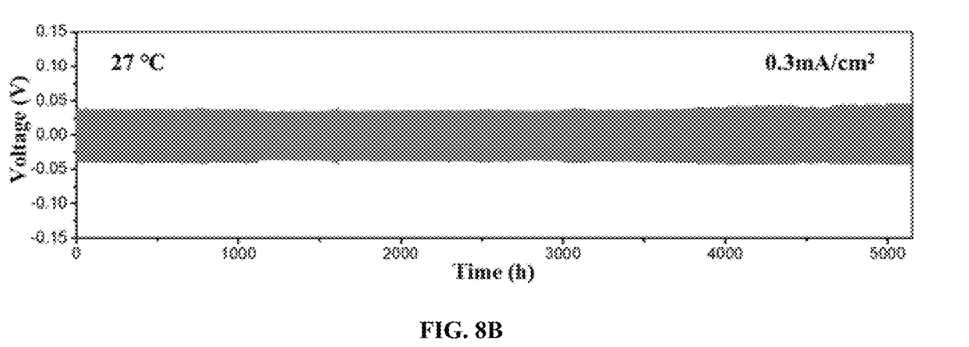
FIG. 8B is the long-term cycling performance of the symmetric cell with a fixed current density of 0.3 mA·cm$^{-2}$ and a fixed capacity of 0.15 mAh·cm$^{-2}$, according to some embodiments.

FIGS. 8A and 8B illustrate electrochemical measurements of Li symmetric cells with discoloration layers (WE1). Specifically, FIG. 8A are critical current density (CCD; correlated to maximum working current of the cell) measurement results of the Li symmetric cell measured at 20 min per period with a current step ranging from 0.2 mA·cm$^{-2}$ to 1.4 mA·cm$^{-2}$. The CCD of the cell at 27° C. is 1.1 mA·cm$^{-2}$. As a comparison, for cells without a discoloration layer, the CCD is measured at less than 0.6 mA·cm$^{-2}$. FIG. 8B is the long-term cycling performance (i.e., working life at a particular current density) of the symmetric cell with a fixed current density of 0.3 mA·cm$^{-2}$ and a fixed capacity of 0.15 mAh·cm$^{-2}$. The cell is able to stably cycle for more than 5000 hrs at 0.3 mA·cm$^{-2}$.

Figure 9A:
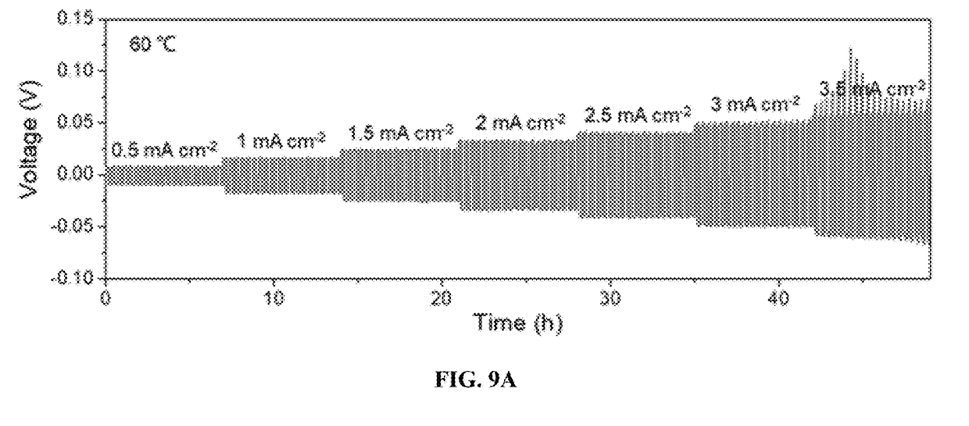
Figure 9B:
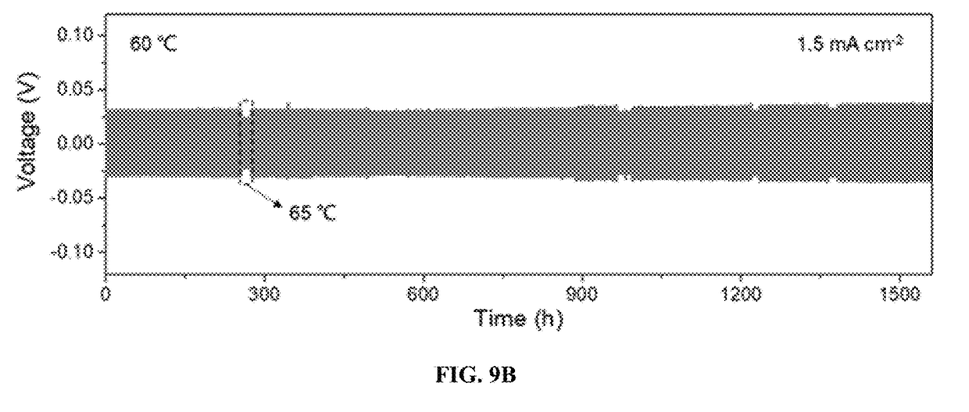
FIG. 9B is the long-term cycling performance of the symmetric cell with a fixed current density of 1.5 mA·cm$^{-2}$ and a fixed capacity of 0.5 mAh·cm$^{-2}$, according to some embodiments.

FIGS. 9A and 9B illustrate electrochemical measurements of Li symmetric cells at 60° C. (WE1). Specifically, FIG. 9A are CCD measurement results of the Li symmetric cell measured at 20 min per period with a current step ranging from 0.5 mA·cm$^{-2}$ to 3.5 mA·cm$^{-2}$. The CCD of the cell at 60° C. (with random 65° C. intervals) is 3.5 mA·cm$^{-2}$. FIG. 9B is the long-term cycling performance of the symmetric cell with a fixed current density of 1.5 mA·cm$^{-2}$ and a fixed capacity of 0.5 mAh·cm$^{-2}$. The cell is able to stably cycle for more than 1500 hrs at 1.5 mA·cm$^{-2}$.

The data of FIGS. 8B and 9B demonstrate that the discoloration layer at the Li/garnet interface is stable during cycling. Without being bound by theory, it is believed that molten Li spreads out then diffuses into garnet's surface through pores in garnet at approximately 340° C. As a result, transition metal ions in garnet due the gain in garnet of additional lithium, which is one possible cause of surface discoloration. This discoloration is regarded as "lithiated garnet" and enhances electronic conductivity of garnet. Therefore, the discoloration layer forms a beneficial transition zone for charge transfer across the Li/garnet interface, resulting in a negligible interfacial resistance less than 1 Ω·cm$^2$, or less than 0.5 Ω·cm$^2$, or less than 0.1 Ω·cm$^2$ at room temperature.

Figure 10A:
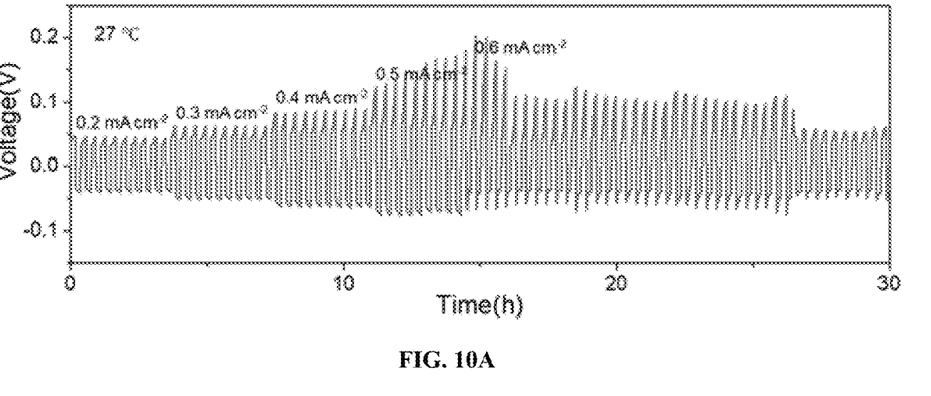
Figure 10B:
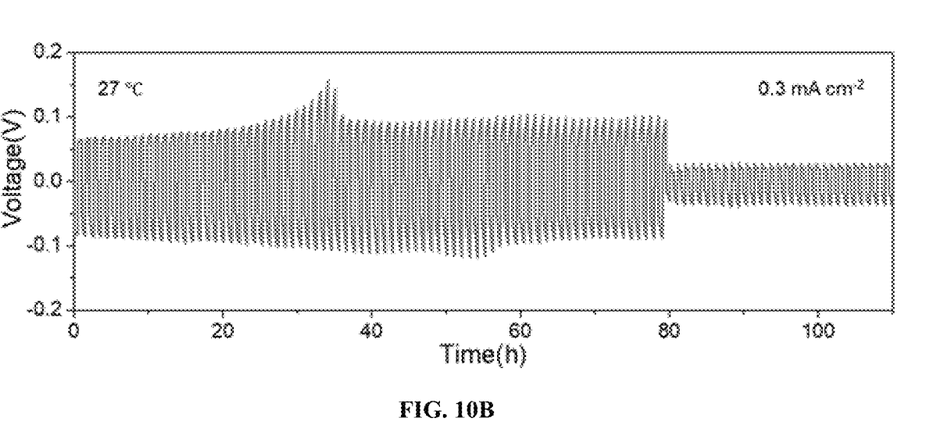
FIG. 10B is the long-term cycling performance of the symmetric cell with a fixed current density of 0.3 mA·cm$^{-2}$ and a fixed capacity of 0.15 mAh·cm$^{-2}$, according to some embodiments.

FIGS. 10A and 10B illustrate electrochemical measurements of Li symmetric cells without discoloration layers (CE1). Specifically, FIG. 10A are CCD measurement results of the Li symmetric cell measured at 20 min per period with a current step ranging from 0.2 mA·cm$^{-2}$ to 1.0 mA·cm$^{-2}$. The CCD of the cell at 27° C. is less than half (only 0.5 mA·cm$^{-2}$) the 1.1 mA·cm$^{-2}$ value shown for WE1 at the same temperature. FIG. 10B is the long-term cycling performance of the symmetric cell with a fixed current density of 0.3 mA·cm$^{-2}$ and a fixed capacity of 0.15 mAh·cm$^{-2}$. The cell shows an unstable cycling performance and short-circuited after 80-hour cycling at 0.3 mA cm$^{-2}$ (as compared to more than 5000 hrs at 0.3 mA·cm$^{-2}$ for WE1).

Figure 11:
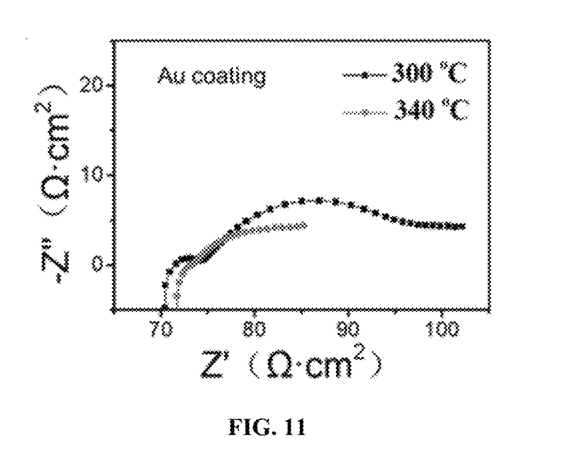
FIG. 11 illustrates Nyquist plots of Li symmetric cells with Au-coated garnet after a 300° C. treatment and a 340° C. heat treatment, according to some embodiments.

The discoloration layer may also form and function well in Li/Au-coated garnet interface (WE2 and CE2). For example, the garnet pellet sputtered with a thin Au modification coating layer also experiences a color change after 340° C. heat treatment (WE2). FIG. 11 illustrates Nyquist plots of Li symmetric cells with Au-coated garnet after a 300° C. treatment (CE2) and a 340° C. heat treatment (WE2), according to some embodiments. As is the case in FIG. 5 for WE1, no obvious semi-circle is observed for WE2, indicating that Li/garnet interfacial resistance is too low to be detected (i.e., less than 1 Ω·cm$^2$, or less than 0.5 Ω·cm$^2$, or less than 0.1 Ω·cm$^2$). In comparison, CE2 has an interfacial resistance of cell 2.5 Ωcm$^2$.

Figure 12:
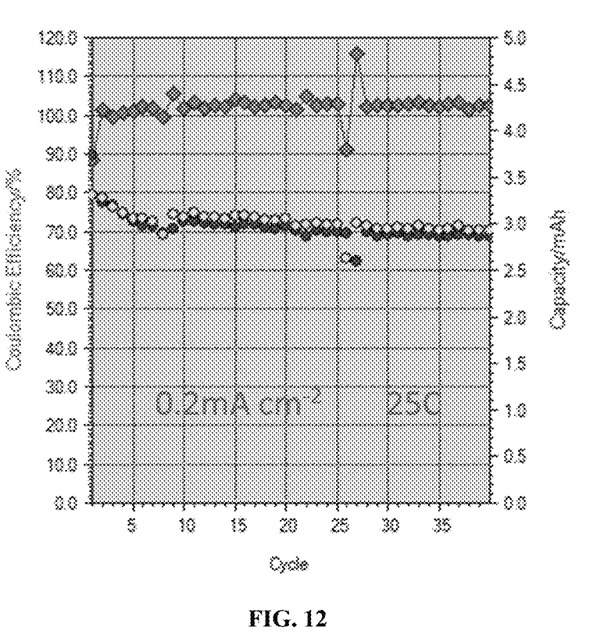
FIG. 12 is the long-term cycling performance of a Li/garnet/LiNi$_{0.5}$Co$_{0.2}$Mn$_{0.3}$O$_2$ cell with a fixed current density of 0.2 mA·cm$^{-2}$ in a range of 3.0V to 4.5V at room temperature.

FIG. 12 illustrates electrochemical measurements of Li symmetric cells with discoloration layers at 25° C. Specifically, FIG. 12 is the long-term cycling performance of a Li/garnet/LiNi$_{0.5}$Co$_{0.2}$Mn$_{0.3}$O$_2$ cell with a fixed current density of 0.2 mA·cm$^{-2}$ in a range of 3.0V to 4.5V at room temperature. The cell is able to stably cycle with negligible capacity fading in the first 40 cycles with a fixed current density of 0.2 mA·cm$^{-2}$ in the test range of 3.0 V to 4.5V at 25° C.

Thus, as presented herein, this disclosure relates to solid-state lithium metal batteries, and more particularly, to Li anode-garnet electrolyte interfaces (and methods of formation thereof) with low interfacial resistances. In other words, an in situ-formed discoloration layer at the Li anode-garnet electrolyte interface is disclosed for garnet-based solid-state batteries. Formation of the discoloration layer (where garnet transitions from tan/white to grey/black) is temperature-dependent, and requires heat treatment greater than 300° C. This layer is beneficial for charge transfer (electron, Li$^+$ ion) through the Li/garnet interface. Discoloration of Ta-doped garnet results from interfacial reduction of $Ta^{5+}$ by Li metal to $Ta^{4+}$ at the garnet interface. The discoloration layer maintains a garnet structure and may be regarded as "lithiated garnet." As a result of the discoloration layer, the interfacial resistance may be reduced to less than 1 Ω·cm$^2$, or less than 0.5 Ω·cm$^2$, or less than 0.1 Ω·cm$^2$ at room temperature, with the resulting symmetric cell stably cycling for more than 5000 hrs at 0.3 mA·cm$^{-2}$ and a fixed capacity of 0.15 mAh·cm$^{-2}$ at room temperature.

Advantages include formation of a Li/garnet interface (1) without using a lithiophilic coating layer or application of high mechanical pressure; (2) short heat treatments for creating the discoloration layer (less than 10 min); and (3) having extremely low interfacial resistances (0.1 Ω·cm$^2$).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A lithium-metal battery, comprising:
   a substrate;
   a cathode disposed on the substrate;
   a garnet solid-state electrolyte disposed on the cathode; and
   a lithium anode disposed on the garnet solid-state electrolyte,
   wherein a discoloration layer is disposed at an interface of the lithium anode and garnet solid-state electrolyte, the discoloration layer comprising:
   a first portion; and
   a second portion,
   wherein the first portion including a lithium component and the second portion including a garnet component.

2. The battery of claim 1, wherein an interfacial resistance at the interface is less than 1 Ω·cm$^2$.

3. The battery of claim 1, wherein a thickness of the discoloration layer is 1 nm to 50 nm.

4. The battery on claim 1, further comprising:
   a modification coating layer disposed between the garnet solid-state electrolyte and the lithium anode.

5. The battery of claim 4, wherein the modification coating layer comprises at least one of: Au, Ag, Al, Si, C, Zn, Mg, Sn, Ti, B, Pb, Ge, or combinations thereof; and has a thickness of 1 nm to 50 nm.

6. The battery of claim 1, wherein the first portion is positioned (A) in pores of the second portion; (B) atop a surface of the second portion; or (C) a combination thereof.

7. A method of forming a lithium-metal battery, comprising:
   stacking a garnet source with at least one lithium source; and
   heating the stack at a temperature of at least 300° C. for a time in a range of 1 sec to 20 min to form a discoloration layer,
   wherein the discoloration layer is disposed at an interface of the garnet source and the lithium source.

8. The method of claim 7, wherein the heating is conducted at a temperature of at least 320° C.

9. The method of claim 7, further comprising:
   prior to stacking the garnet source with the at least one lithium source, sputtering the garnet source with a modification coating source.

10. The method of claim 9, wherein the modification coating layer comprises at least one of: Au, Ag, Al, Si, C, Zn, Mg, Sn, Ti, B, Pb, Ge, or combinations thereof.

11. The method of claim 9, wherein:
    a thickness of the discoloration layer is 1 nm to 50 nm; and
    a thickness of the modification coating layer is 1 nm to 50 nm.

12. The method of claim 7, the discoloration layer comprises:
    a first portion; and
    a second portion,
    wherein the first portion includes a lithium component and the second portion includes a garnet component.

13. The method of claim 12, wherein the first portion is positioned (A) in pores of the second portion; (B) atop a surface of the second portion; or (C) a combination thereof.

14. The method of claim 1, wherein the interface is configured to have an interfacial resistance of less than 1 Ω·cm$^2$.

* * * * *

UNITED STATES PATENT AND TRADEMARK OFFICE
CERTIFICATE OF CORRECTION

| | | |
|---|---|---|
| PATENT NO. | : 11,605,836 B2 | Page 1 of 1 |
| APPLICATION NO. | : 17/196355 | |
| DATED | : March 14, 2023 | |
| INVENTOR(S) | : Michael Edward Badding et al. | |

It is certified that error appears in the above-identified patent and that said Letters Patent is hereby corrected as shown below:

On the Title Page

In Column 1, below "Prior Publication Data", Line 1, below "Sep. 16, 2021" insert -- (30) Foreign Application Priority Data Mar. 10, 2020 (CN) .......... 202010163216.5 --, as a new field entry.

In the Claims

In Column 12, Line 12, in Claim 4, delete "on" and insert -- of --.

Signed and Sealed this
Fourth Day of March, 2025

Coke Morgan Stewart
*Acting Director of the United States Patent and Trademark Office*